United States Patent
Lee et al.

(10) Patent No.: US 11,251,459 B2
(45) Date of Patent: Feb. 15, 2022

(54) ELECTROCHEMICAL ELEMENT COMPRISING CELLULOSE NANOFIBER SEPARATOR AND METHOD FOR PRODUCING SAME

(71) Applicant: Korea Forest Research Institute, Seoul (KR)

(72) Inventors: Sun Young Lee, Seoul (KR); Sang Young Lee, Busan (KR); Keun Ho Choi, Gangneung-si (KR); Sang Jin Chun, Namyangju-si (KR); Sang Bum Park, Seoul (KR); Don Ha Choi, Gangnam-gu (KR); Sung Ju Cho, Cheorwon-gun (KR); Jong Tae Yoo, Suwon-si (KR); Chang Kee Lee, Seoul (KR); Woong Kim, Seoul (KR); Qinglin Wu, Baton Rouge, LA (US)

(73) Assignee: Korea Forest Research Institute, Seoul (KR)

( * ) Notice: Subject to any disclaimer, the term of this patent is extended or adjusted under 35 U.S.C. 154(b) by 346 days.

(21) Appl. No.: 15/514,519

(22) PCT Filed: Sep. 29, 2014

(86) PCT No.: PCT/KR2014/009124
§ 371 (c)(1),
(2) Date: Mar. 26, 2017

(87) PCT Pub. No.: WO2016/047835
PCT Pub. Date: Mar. 31, 2016

(65) Prior Publication Data
US 2017/0222252 A1    Aug. 3, 2017

(30) Foreign Application Priority Data
Sep. 26, 2014 (KR) .................. KR10-2014-0129587

(51) Int. Cl.
*H01M 50/429* (2021.01)
*H01M 4/62* (2006.01)
(Continued)

(52) U.S. Cl.
CPC ....... *H01M 10/052* (2013.01); *H01M 4/1391* (2013.01); *H01M 4/1395* (2013.01);
(Continued)

(58) Field of Classification Search
CPC ........... H01M 10/052; H01M 10/0436; H01M 4/625; H01M 4/624; H01M 4/1397;
(Continued)

(56) References Cited

U.S. PATENT DOCUMENTS

| | | | | |
|---|---|---|---|---|
| 2005/0266150 A1* | 12/2005 | Yong | ................... | H01M 4/0416 |
| | | | | 427/58 |
| 2006/0046149 A1* | 3/2006 | Yong | ..................... | H01M 2/166 |
| | | | | 429/251 |
| 2017/0200943 A1* | 7/2017 | Kawakami | ............. | H01G 11/06 |

FOREIGN PATENT DOCUMENTS

| JP | 2014-010970 | 1/2014 |
|---|---|---|
| KR | 10-2008-0013209 | 2/2008 |

(Continued)

OTHER PUBLICATIONS

Heterolayered, One-Dimensional Nanobuilding Block Mat Batteries, Choi et al., Sep. 16, 2014, vol. 14, p. 5677-5686 (Year: 2014).*
(Continued)

*Primary Examiner* — Christian Roldan (57) ABSTRACT

The present invention relates to an electrochemical element and a method for producing same, the electrochemical element comprising: electrodes comprising a composite of active material and conductive material having a nanofiber structure; and a cellulose nanofiber separator combined with the electrodes. The electrochemical element according to the
(Continued)

present invention obviates the need for separate binder and electrode current collector, has a stable interfacial surface due to the physical union of the separator and electrode, can assure superb mechanical and physical properties, and can maintain stable battery performance even against deformations due to a variety of external impact.

4 Claims, 9 Drawing Sheets (51) Int. Cl.
    *H01M 10/04*     (2006.01)
    *H01M 10/052*     (2010.01)
    *H01M 4/1397*     (2010.01)
    *H01M 4/1395*     (2010.01)
    *H01M 4/1391*     (2010.01)
    *H01M 50/44*     (2021.01)
    *H01M 50/46*     (2021.01)
    *H01M 50/409*     (2021.01)
    *H01M 50/431*     (2021.01)
    *H01M 10/058*     (2010.01)
    *H01M 4/131*     (2010.01)
    *H01M 4/134*     (2010.01)
    *H01M 4/136*     (2010.01)

(52) U.S. Cl.
    CPC ........... *H01M 4/1397* (2013.01); *H01M 4/62* (2013.01); *H01M 4/624* (2013.01); *H01M 4/625* (2013.01); *H01M 4/626* (2013.01); *H01M 10/0436* (2013.01); *H01M 10/058* (2013.01); *H01M 50/409* (2021.01); *H01M 50/4295* (2021.01); *H01M 50/431* (2021.01); *H01M 50/44* (2021.01); *H01M 50/46* (2021.01); *H01M 4/131* (2013.01); *H01M 4/134* (2013.01); *H01M 4/136* (2013.01)

(58) Field of Classification Search
CPC .. H01M 4/1395; H01M 4/1391; H01M 4/626; H01M 2/1626; H01M 2/1646; H01M 2/1673; H01M 2/16; H01M 10/04; H01M 4/62; H01M 4/131; H01M 4/136; H01M 4/134
USPC ........................................................ 429/322
See application file for complete search history.

(56) References Cited

FOREIGN PATENT DOCUMENTS

| KR | 10-1164650 | 7/2012 |
| KR | 10-2014-0050874 | 4/2014 |
| KR | 10-2014-0106876 | 9/2014 |
| WO | WO 2016/047835 | 3/2016 |

OTHER PUBLICATIONS

Jabbour et al., Aqueous processing of cellulose based paper-anodes for flexible Li-ion batteries, Journal of Materials Chemistry, 2012, 22, 3227-3223. (Year: 2011).*
International Search Report and the Written Opinion dated Jun. 16, 2015 From the Korean Intellectual Property Office Re. Application No. PCT/KR2014/009124 and Its Translation of Search Report Into English. (8 Pages).
Choi et al. "Heterolayered, One-Dimensional Nanobuilding Block Mat Batteries", Nano Letters, 14(10): 5677-5686, Sep. 16, 2014. Abstract, p. 5677-5680, 5685, Figs.3b, 5c.
Chun et al. "Eco-Friendly Cellulose Nanofiber Paper-Derived Separator Membranes Featuring Tunable Nanoporous Network Channels for Lithium-Ion Batteries", Journal of Materials Chemistry, 22(32): 16618-16626, Published Online Jun. 20, 2012.
Jia et al. "High-Performance Felxible Lithium-Ion Electrodes Based on Robust Network Architecture", Energy & Environmental Science, 5(5): 6845-6849, Puboished Online Feb. 2, 2012.

* cited by examiner

ELECTROCHEMICAL ELEMENT COMPRISING CELLULOSE NANOFIBER SEPARATOR AND METHOD FOR PRODUCING SAME

RELATED APPLICATIONS

This application is a National Phase of PCT Patent Application No. PCT/KR2014/009124 having International filing date of Sep. 29, 2014, which claims the benefit of priority of Korean Patent Application No. 10-2014-0129587 filed on Sep. 26, 2014. The contents of the above applications are all incorporated by reference as if fully set forth herein in their entirety.

Field and Background of the Invention

The present invention relates to an electrochemical element including a cellulose nanofiber separator and a method of producing the same.

Recently, as the importance of a flexible lithium-ion secondary battery which can be variously designed to be used in a roll-up display, a wearable electronic device and the like has increased, research is being actively conducted on a flexible material which can be applied to various types of electrochemical elements. A lithium-ion secondary battery is largely composed of an anode, a separator, a cathode and an electrolyte.

Currently, a lithium-ion secondary battery is manufactured by sequentially stacking a positive electrode/a separator/a negative electrode, all of which are in a film form, in a case with a standard structure and then injecting an electrolyte. However, such a battery with a standard structure has many limitations in satisfying the design diversity required in flexible batteries because of its poor physical flexibility.

In particular, electrodes (positive electrode and negative electrode) of components of an existing lithium-ion secondary battery are manufactured by applying an electrode mixture prepared by dispersing an electrode active material together with a conductive material and a binder in a solvent in which the binder can be dissolved (usually N-methylpyrrolidone) to a current collector. In this case, the binder is an essential element for increasing adhesive strength between a current collector and an active material, an active material and an active material, and an active material and a conductive material, but has problems of decreases in electronic conductivity and energy density of an electrode, a high-cost process, and relatively low productivity. Therefore, for the next-generation secondary battery, it is necessary to conduct research for having high energy density by reducing or removing the binder compared to the related art and for improving high output characteristics by increasing electronic conductivity.

In addition, a method of applying an electrode mixture to a metal current collector has a problem in which an electrode layer is desorbed from the metal current collector when bending a battery, and thus it is difficult to implement a flexible secondary battery. Among the attempts to solve the problem that can be caused when bending a battery due to such a structure of an electrode, there is a technology based on a current collector with a three-dimensional structure. However, this technology is also based on the process of applying an electrode mixture as an existing method, and therefore has a limitation in suppressing desorption of an electrode layer when bending a battery.

Meanwhile, the existing battery is vulnerable to a safety problem such as heat generation or explosion due to the use of a separator vulnerable to heat. Also, since the existing battery has a structure in which a positive electrode/a separator/a negative electrode sequentially stacked are prepared by a separate process, an interfacial contact between the separator and the electrode depending on physical deformation may occur when the existing battery is applied to a flexible battery, resulting in an internal short circuit of a battery. Therefore, it is necessary to conduct research for solving these problems.

SUMMARY OF THE INVENTION

The present invention is directed to providing an electrochemical element which can be manufactured without a separate binder and a separate electrode current collector, exhibits excellent ionic conductivity and electronic conductivity, and can implement high capacity and high output characteristics, and a method of producing the same.

In order to solve the above problems, the present invention provides an electrode-separator composite which includes an electrode having a composite of an active material and a conductive material with a nanofiber structure; and a cellulose nanofiber separator combined with the electrode.

In addition, the present invention provides an electrochemical element which includes the electrode-separator composite.

In addition, the present invention provides a method of producing an electrochemical element, which includes preparing an electrode mixture by mixing an active material, a conductive material with a nanofiber structure, a solvent and a dispersant; and forming a separator combined with an electrode by filtering the electrode mixture on a cellulose nanofiber separator.

Advantageous Effects

The electrochemical element according to the present invention has a highly stable interfacial surface due to the physically combined separator and electrode, can ensure excellent mechanical properties, can implement stable battery performance even against deformations caused by various external forces, and can suppress the risk of battery ignition, explosion and the like caused by deformation of the battery. Also, since the electrochemical element according to the present invention does not require a separate binder, excellent ionic conductivity and electronic conductivity are exhibited, and high capacity and high output characteristics can be implemented by removing a binder and an electrode current collector.

BRIEF DESCRIPTION OF THE SEVERAL VIEWS OF THE DRAWINGS

FIGS. 15AI, 15AII, 15BI and 15BII illustrate images of an evaluation result of dimensional stability depending on exposure to high temperature according to an example and a comparative example, wherein each of AI and AII represents an example before and after exposure to high temperature, and each of BI and BII represents a comparative example before and after exposure to high temperature.

DESCRIPTION OF SPECIFIC EMBODIMENTS OF THE INVENTION

As the present invention allows for various changes and numerous embodiments, particular embodiments will be illustrated in the drawings and described in detail in the detailed description.

However, this is not intended to limit the present invention to specific embodiments, and it should be appreciated that all changes, equivalents, or substitutes within the spirit and technical scope of the present invention are included in the present invention. In descriptions of the present invention, when detailed descriptions of related known art are deemed to unnecessarily obscure the gist of the present invention, they will be omitted.

Also, it should be understood that although the terms "first," "second," etc. may be used herein to describe various components, these components are not limited by these terms. These terms are used only to distinguish one component from another.

The terms used herein merely explain the specific embodiments but are not intended to limit the present invention. Singular expressions, unless defined otherwise in context, include plural expressions.

In the present application, it should be appreciated that the terms "include" or "have" are merely intended to indicate that features, numbers, steps, operations, components, parts, or combinations thereof are present, and not intended to exclude a possibility that one or more other features, numbers, steps, operations, components, parts, or combinations thereof will be present or added.

Therefore, since configurations illustrated in the embodiments described in this specification are only exemplary embodiments and do not represent the overall technological scope of the present invention, it is understood that the invention covers various equivalents, modifications, and substitutions at the time of filing of this application.

Hereinafter, an electrode-separator composite according to the present invention will be described in detail.

The electrode-separator composite according to the present invention may include an electrode having a composite of an active material and a conductive material with a nanofiber structure; and a cellulose nanofiber separator combined with the electrode.

The electrode-separator composite according to the present invention does not require a separate binder and a separate electrode current collector, and may be a porous electrode layer formed by mixing a nanofiber conductive material with one-dimensional structure and an active material. Specifically, the electrode may include an active material, a conductive material with a nanofiber structure and a solvent. The electrode and the separator are superimposed and physically combined through a filtration process, and thus it is possible to exhibit excellent interfacial stability and prevent the desorption of an electrode layer or an internal short circuit of a battery even when physical deformation is applied to a battery. Therefore, the electrode-separator composite according to the present invention exhibits excellent ionic conductivity and electronic conductivity.

Figure 7:
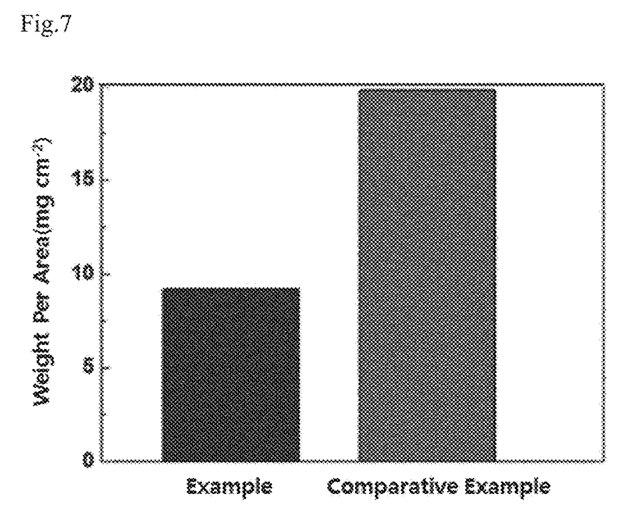
FIG. 7 is a graph showing the comparison result of weights per area according to an example and a comparative example.
Figure 8:
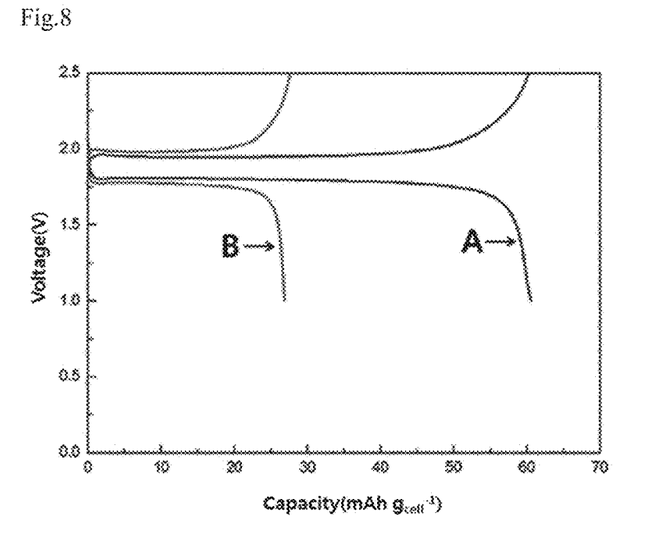
FIG. 8 is a graph showing the comparison result of capacities per area according to an example and a comparative example, wherein A represents an example and B represents a comparative example.

By way of one example, the electrode-separator composite according to the present invention may have a weight per unit area of 30 mg/cm$^2$ or less, 12 mg/cm$^2$ or less or 5 to 10 mg/cm$^2$, specifically, 8 to 10 mg/cm$^2$. Since the electrode-separator composite according to the present invention does not require a separate binder and a separate metal current collector, the electrode-separator composition maintains a significantly low weight per area compared to a conventional electrode-separator composite. In this regard, FIG. 7 is a graph showing the comparison result of weights per area according to an example and a comparative example. Also, FIG. 8 is a graph showing the comparison result of capacities per area, and it can be seen that the capacity per area in an example (A) is superior to that in a comparative example (B).

By way of another example, the separator according to the present invention may have an average thickness in a range of 0.01 to 500 μm. Specifically, the separator may have an average thickness in a range of 0.5 to 200 μm, 1 to 100 μm or 5 to 50 μm. When an average thickness of the separator is within these ranges, it is easy to be physically combined with the electrode upon formation of the electrode-separator composite and it is possible to implement excellent mechanical properties such as excellent flexibility and the like.

By way of still another example, the electrode according to the present invention may have an average thickness in a range of 0.01 to 500 μm. Specifically, the electrode may have an average thickness in a range of 0.5 to 300 μm, 1 to 200 μm, 5 to 80 μm or 10 to 50 μm. When an average thickness of the electrode is within these ranges, it is easy to be physically combined with the electrode upon formation of the electrode-separator composite, and it is possible to implement excellent mechanical properties such as excellent flexibility and the like.

By way of yet another example, the active material according to the present invention is not specifically limited as long as a material has an average particle size in a range of 0.001 to 20 μm, specifically, 1 to 1,500 nm or 50 to 1,000 nm. The types thereof may include, for example, one or more selected from the group consisting of lithium nickel oxide, lithium cobalt oxide, lithium nickel manganese oxide, lithium nickel cobalt manganese oxide, lithium nickel cobalt aluminum oxide, lithium iron phosphate oxide, a material that is capable of reversibly intercalating and deintercalating a lithium ion, lithium metal, an alloy of lithium metal, a material that is capable of doping and dedoping lithium, a transition metal oxide and a combination thereof.

By way of yet another example, the conductive material with a nanofiber structure is not specifically limited as long as a material has an average diameter in a range of 0.001 to 100 μm and a one-dimensional structure. For example, the conductive material may include one or more selected from the group consisting of a carbon-based material such as carbon fibers and the like; a metal-based material such as metallic fibers and the like (e.g., copper, nickel, aluminum, silver and the like); a conductive polymer such as a polyphenylene derivative and the like; and a mixture thereof.

By way of yet another example, the cellulose nanofibers may have an average diameter in a range of 10 to 1000 nm. When an average diameter of the cellulose nanofibers is within this range, it is easy to form fibers, and it is possible to prevent the deterioration of an interfacial surface with the electrode caused by unevenness of the sheet surface. The cellulose nanofibers are not specifically limited as long as a material has an average diameter in a range of 10 to 1,000 nm. For example, the cellulose nanofibers may include one or more selected from the group consisting of cellulose nanofibers separated from a nano-sized woody material, sea algae nanofibers, and bacterial cellulose obtained by incubating bacteria, and may also include one or more selected from a derivative and mixture of the above nanofibers.

By way of yet another example, the separator according to the present invention may include an inorganic particle. When inorganic particles are added to the separator, it is possible to effectively implement a porous structure by suppressing aggregation of nanofibers compared to a membrane formed of only cellulose. The inorganic particle may include, without specific limitation, for example, one or more selected from the group consisting of $SiO_2$, $Al_2O_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $SrTiO_3$, $SnO_2$, $CeO_2$, $MgO$, $NiO$, $CaO$, $ZnO$, $ZrO_2$ and $SiC$.

By way of yet another example, the electrode according to the present invention may further include a dispersant. The dispersant is used for uniformly dispersing an electrode mixture, and is not specifically limited as long as an electrode mixture can be effectively dispersed. For example, the dispersant may include one or more selected from the group consisting of a surfactant such as sodium dodecyl sulfate (SDS), sodium dodecylbenzene sulfonate (SDBS), cetrimide (CTAB) and the like; and a polymer-based dispersant such as polybenzimidazole (PBI), polyvinylpyrrolidone (PVP) and the like.

Hereinafter, an electrochemical element according to the present invention will be described in detail.

The electrochemical element according to the present invention may include the above-described electrode-separator composite.

By way of one example, the electrochemical element according to the present invention may satisfy the following Equation 1 upon charging.

$$|V_{c1}-V_{c2}|\leq 0.02 \qquad \text{Equation 1}$$

In Equation 1, $V_{c1}$ represents a voltage when a battery is bent to have a radius of curvature of 2.5 mm, and $V_{c2}$ represents a voltage measured when a battery is not bent.

In addition, the electrochemical element according to the present invention may satisfy the following Equation 2 upon discharging.

$$|V_{dc1}-V_{dc2}|\leq 0.01 \qquad \text{Equation 2}$$

In Equation 2, $V_{dc1}$ represents a voltage when a battery is bent to have a radius of curvature of 2.5 mm, and $V_{dc2}$ represents a voltage measured when a battery is not bent.

Figure 11:
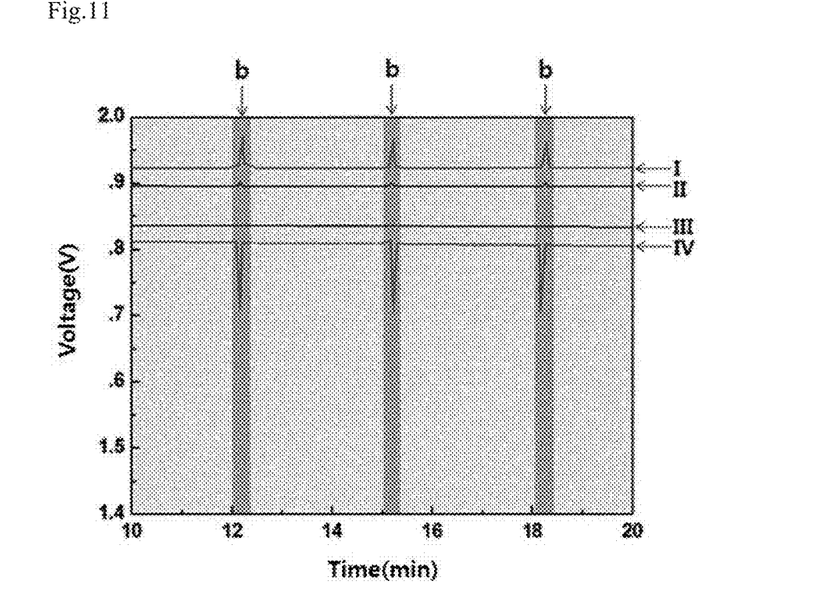
FIG. 11 is a graph showing the evaluation result of charging and discharging characteristics depending on bending according to an example and a comparative example, wherein b represents a point at which a battery is bent, I represents a voltage according to an example upon charging, II represents a voltage according to a comparative example upon charging, III represents a voltage according to an example upon discharging, and IV represents a voltage according to a comparative example upon discharging.

In the electrochemical element according to the present invention, the electrode and the separator are stably combined, and thus a change in voltage is very small even when physical changes are made during operation of a battery, and stable charging and discharging behaviors are exhibited. In this regard, an experimental result is shown in FIG. 11. Referring to FIG. 11, b represents a point at which a battery is bent, I represents a voltage according to an example upon charging, II represents a voltage according to a comparative example upon charging, III represents a voltage according to an example upon discharging, and IV represents a voltage according to a comparative example upon discharging. It can be seen that a very low voltage difference of less than 0.02 is exhibited when a battery is bent upon charging and discharging in the case of an example (II and III), but a large voltage difference of about 0.04 upon charging and about 0.09 upon discharging when a battery is bent is exhibited in the case of a comparative example (I and IV).

Therefore, it was confirmed that the electrochemical element according to the present invention was capable of exhibiting stable charging and discharging behaviors due to interfacial stability of the electrode and the separator and excellent mechanical properties even when physical deformation is applied to a battery.

Hereinafter, a method of producing an electrochemical element according to the present invention will be described in detail.

The present invention provides the method of producing an electrochemical element, which includes preparing an electrode mixture by mixing an active material, a conductive material with a nanofiber structure, a solvent and a dispersant; and forming a separator combined with an electrode by filtering the electrode mixture on a cellulose nanofiber separator.

In the method of producing an electrochemical element according to the present invention, the preparation of an electrode mixture may include, specifically, preparing an electrode mixture by mixing an active material, carbon nanofibers and a solvent, and then further adding a dispersant for uniformly dispersing the active material and carbon nanofibers. Also, the preparation may further include dispersing the electrode mixture for a uniform dispersion state of the electrode mixture after the addition of the dispersant. In this case, sonication, a ball milling process or the like may be used as a method of dispersing the electrode mixture without specific limitation.

In the preparation of an electrode mixture, the active material is not specifically limited as long as a material has an average particle size in a range of 0.001 to 20 µm, specifically, 1 to 1,500 nm or 50 to 1,000 nm. The type of the active material may include, for example, one or more selected from the group consisting of lithium nickel oxide, lithium cobalt oxide, lithium nickel manganese oxide, lithium nickel cobalt manganese oxide, lithium nickel cobalt aluminum oxide, lithium iron phosphate oxide, a material that is capable of reversibly intercalating and deintercalating a lithium ion, lithium metal, an alloy of lithium metal, a material that is capable of doping and dedoping lithium, a transition metal oxide and a combination thereof.

In the preparation of an electrode mixture according to the present invention, the conductive material with a nanofiber structure is not specifically limited as long as a material has an average diameter in a range of 0.001 to 100 µm. The type of the conductive material may include, for example, one or more selected from the group consisting of a carbon-based material such as carbon fibers and the like; a metal-based material such as metallic fibers and the like (e.g., copper, nickel, aluminum, silver and the like); a conductive polymer such as a polyphenylene derivative and the like; and a mixture thereof.

In the preparation of an electrode mixture according to the present invention, the solvent is not specifically limited as long as a solvent is suitable for preparing an electrode mixture. For example, the solvent may be distilled water, water, an alcohol (e.g., ethanol, propanol or butanol), N-methylpyrrolidone or a mixture thereof.

In the preparation of an electrode mixture according to the present invention, the dispersant may be included at 0.1 to 10 parts by weight or 0.5 to 5 parts by weight with respect to 100 parts by weight of the electrode mixture, and the type thereof is not specifically limited as long as an electrode mixture can be effectively dispersed. For example, the dispersant may include one or more selected from the group consisting of a surfactant such as sodium dodecyl sulfate (SDS), sodium dodecylbenzene sulfonate (SDBS), cetrimide (CTAB) and the like; and a polymer-based dispersant such as polybenzimidazole (PBI), polyvinylpyrrolidone (PVP) and the like.

In the preparation of an electrode mixture according to the present invention, the active material and the conductive material with a nanofiber structure may be included in a mixed ratio of 50:50 to 60:40, 99:1 to 70:30 or 90:10 or 80:20.

In the method of producing an electrochemical element according to the present invention, the formation of a separator combined with an electrode, specifically, may include preparing a cellulose nanofiber-dispersed solution and then filtering the solution to prepare a separator. In this case, the formation may further include adding an inorganic particle to the cellulose nanofiber-dispersed solution.

In addition, the formation of a separator combined with an electrode may include drying a sheet obtained by filtering an electrode mixture on the separator according to the present invention. The inorganic particle is not specifically limited and may include, for example, one or more selected from the group consisting of $SiO_2$, $Al_2O_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $SrTiO_3$, $SnO_2$, $CeO_2$, MgO, NiO, CaO, ZnO, $ZrO_2$ and SiC.

In addition, in the formation of a separator combined with an electrode, cellulose nanofibers are not specifically limited as long as a material has an average diameter in a range of 10 to 1,000 nm. For example, the cellulose nanofibers may include one or more selected from the group consisting of cellulose nanofibers separated from a nano-sized woody material, sea algae nanofibers, and bacterial cellulose obtained by incubating bacteria, and may also include one or more selected from a derivative and mixture of the above nanofibers.

The electrochemical element produced by the production method according to the present invention has an advantage of reducing manufacturing costs because a separate binder is not required by a sequential filtration process. Also, the electrochemical element has an advantage in which an interfacial surface of the electrode-separator composite is highly stable, and thus excellent mechanical properties can be ensured because the electrode and the separator are superimposed and physically combined. Therefore, the electrochemical element to which the electrode-separator composite is applied can implement stable battery performance even against deformations caused by various external forces and can prevent the risk of battery ignition, explosion and the like caused by deformation of the battery.

Hereinafter, based on the above-described description, the present invention will be described in more detail with reference to examples and drawings. The following examples are provided to exemplify the present invention, and do not limit the scope of the present invention.

EXAMPLE

1) Preparation of Electrode Mixture $LiFePO_4$ having an average particle size of 500 nm as a positive electrode active material, $Li_4Ti_5O_{12}$ having an average particle size of 300 nm as a negative electrode active material, and carbon nanofibers as a nanofiber-type conductive material were used. As a dispersant for uniformly dispersing the carbon nanofibers, sodium dodecylbenzene sulfonate (SDBS) was used. First, a solution was prepared by adding 1% by weight of a dispersant to distilled water, and a positive electrode or negative electrode active material and carbon nanotubes were added in a weight ratio of 85:15 to the solution to prepare an electrode (positive electrode or negative electrode) mixture. For a uniform dispersion effect, the electrode mixture was dispersed through sonication for 1 hour to prepare an electrode mixture.

2) Preparation of Separator

Cellulose powder (having an average particle size of up to 45 µm; KC flock, Nippon Paper Chemicals Co., Ltd) was added to 2% by weight of a sodium hydroxide (NaOH) aqueous solution. The resulting substance was vigorously stirred for 1 hour, and then passed through a homogenizer (M-1100EH-30, Microfluidics, USA) 12 times to prepare a cellulose nanofiber-dispersed solution. The cellulose nanofiber-dispersed solution thus prepared was poured onto a filter paper laid on top of a porcelain Buchner funnel, and then filtered under reduced pressure through a vacuum pump to prepare a separator.

3) Preparation of Electrode-Separator Composite

The electrode mixture prepared in Step 1 was poured onto the prepared separator and then filtered under reduced pressure. The filtration was performed alternately with ethanol and acetone. Afterward, the resulting substance was lyophilized under conditions of −95° C. and $5 \times 10^{-3}$ Torr, then dried at 100° C. for 12 hours, and thus moisture was removed to prepare a separator-electrode composite.

Figure 1:
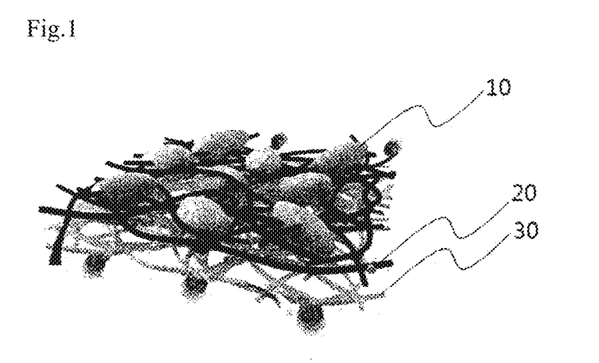
FIG. 1 illustrates a schematic diagram of an electrode-separator composite according to the present invention.

FIG. 1 illustrates a schematic diagram of the electrode-separator composite according to Example of the present invention. Referring to FIG. 1, it can be seen that an electrode mixture prepared by mixing an active material 10 and carbon nanofibers 20 was combined with a cellulose nanofiber separator 30.

Figure 2:
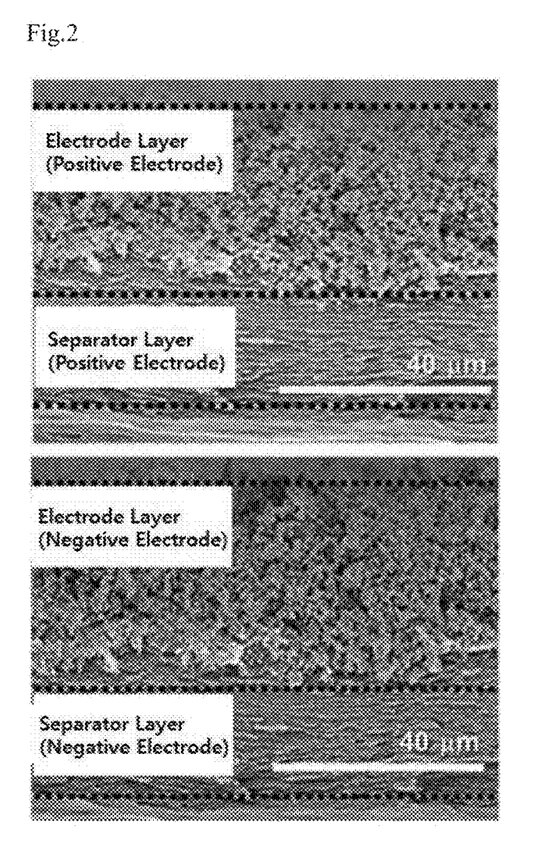
FIG. 2 illustrates scanning electron microscope (SEM) images of cross sections of electrode-separator composites according to the present invention.

FIG. 2 illustrates scanning electron microscope (SEM) images of cross sections of the positive electrode-separator composite and the negative electrode-separator composite according to Example of the present invention. Referring to FIG. 2, it can be seen that an electrode layer of the electrode-separator composite according to the present invention was formed to have a height in a range of about 30 to 40 μm, and a separator layer thereof was formed to have a height of about 20 μm.

Figure 3:
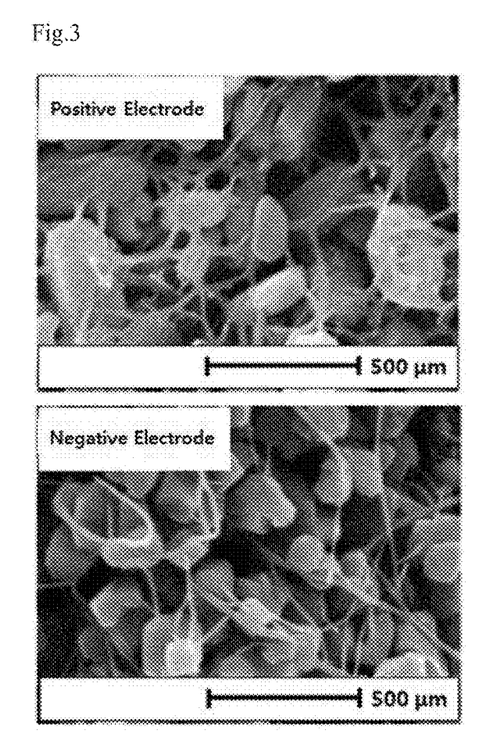
FIG. 3 illustrates SEM images of electrode surfaces of electrode-separator composites according to the present invention.

FIG. 3 illustrates SEM images of electrode surfaces of the positive electrode-separator composite and the negative electrode-separator composite according to Example of the present invention. Referring to FIG. 3, it can be seen that the active material and carbon nanofibers were uniformly dispersed.

4) Manufacture of Lithium Secondary Battery

The separator-positive electrode composite and the separator-negative electrode composite prepared through Steps 1 to 3 were stacked, and a liquid electrolyte (1 M $LiPF_6$ in EC/DEC (1/1 v/v)) was injected to manufacture a lithium secondary battery including a cellulose nanofiber separator combined with an electrode.

COMPARATIVE EXAMPLE

1) Preparation of Electrode Mixture $LiFePO_4$ having an average particle size of 500 nm as a positive electrode active material, $Li_4Ti_5O_{12}$ having an average particle size of 300 nm as a negative electrode active material, and carbon black as a conductive material were used. Polyvinylidene fluoride (PVDF) as a binder was added to N-methyl-2-pyrrolidone (NMP) as a solvent to prepare an electrode slurry. In this case, solid contents of the positive electrode and negative electrode slurries were composed in a weight ratio of a positive electrode active material: a conductive material: a binder=80:10:10 and in a weight ratio of a negative electrode active material: a conductive material: a binder=88:2:10, respectively. The electrode slurry was applied to an aluminum current collector having a thickness of 20 μm, dried to prepare a positive electrode, and then subjected to roll-pressing to prepare an electrode.

2) Manufacture of Lithium Secondary Battery

The positive electrode and the negative electrode thus prepared, a polyethylene separator as a polyolefin-based separator, and a liquid electrolyte (1 M $LiPF_6$ in EC/DEC (1/1 v/v)) were used to manufacture a lithium secondary battery.

EXPERIMENTAL EXAMPLE 1

Interfacial Stability Evaluation

Experiments for evaluating the interfacial stability, flexibility, porosity and electronic conductivity of the electrode-separator composite according to the present invention were conducted.

Figure 4A:
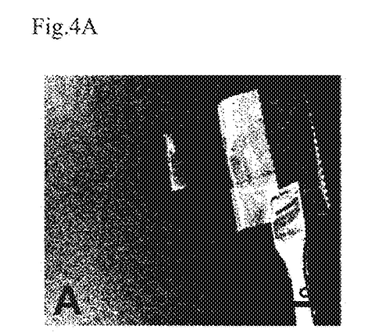
FIGS. 4A and 4B illustrate images obtained by evaluating interfacial stability of an electrode-separator composite according to the present invention, wherein A represents an example and B represents a comparative example.
Figure 4B:
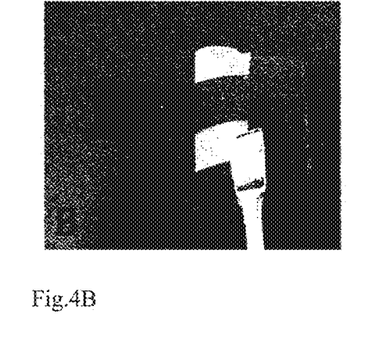

A taping test was performed for the electrode-separator composites prepared in Example and that of Comparative Example. A tape used in the test was Scotch tape (Scotch brand #600 commercially available from 3M) having a width of 25 mm and an adhesive strength of 43±6 g/mm. After attached to the electrode-separator composite, the tape was detached at a rate of 0.5 cm/sec. The results are shown in FIG. 4. Referring to FIG. 4, it can be seen that the electrode and the separator were not separated in the case of Example (A), but the electrode and the separator were separated in the case of Comparative Example (B).

Therefore, it was confirmed that an interfacial surface was highly stably combined due to physical combination through a filtration process in the electrode-separator composite according to the present invention.

EXPERIMENTAL EXAMPLE 2

Flexibility Evaluation

Figure 5:
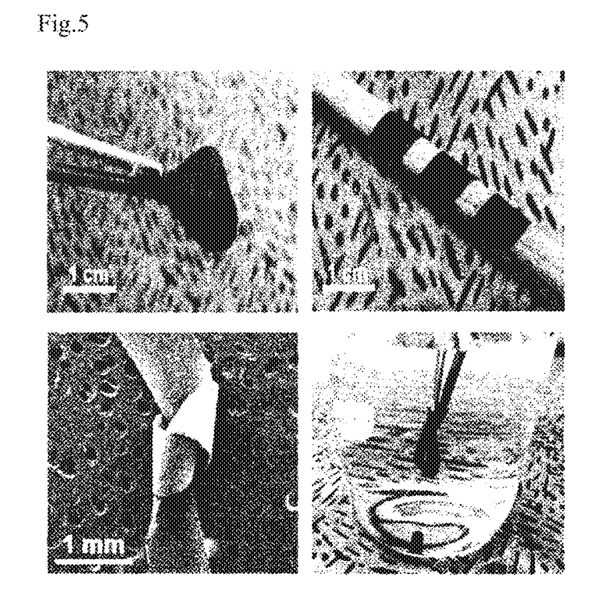
FIG. 5 illustrates images obtained by evaluating flexibility of an electrode-separator composite according to the present invention.

In order to evaluate the flexibility of the electrode-separator composite according to the present invention, various tests were performed for the electrode-separator composite prepared in Example. The results are shown in FIG. 5. Referring to FIG. 5, it can be seen that the electrode-separator composite according to the present invention exhibited excellent flexibility to a level at which the composite can be knotted, and exhibited flexibility to a level at which the composite can be repeatedly bent even when the composite was immersed in the liquid electrolyte (1 M $LiPF_6$ in EC/DEC (1/1 v/v)).

Therefore, it was confirmed that the electrode-separator composite according to the present invention can ensure excellent mechanical properties and flexibility even without a separate binder or a separate current collector.

EXPERIMENTAL EXAMPLE 3

Heat Resistance Evaluation

Experiments for evaluating the heat resistance of the electrode-separator composite according to the present invention were conducted.

Figure 6A:
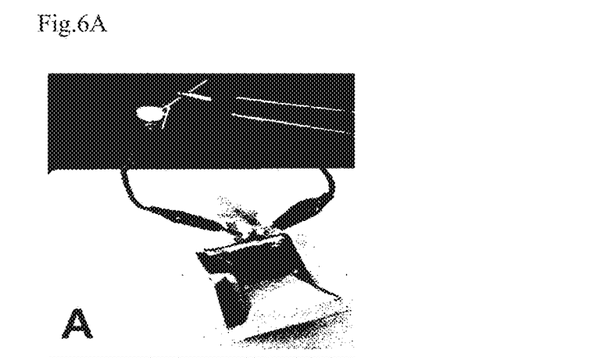
FIGS. 6A and 6B illustrate images obtained by evaluating heat resistance according to an example and a comparative example, wherein A represents an example and B represents a comparative example.
Figure 6B:
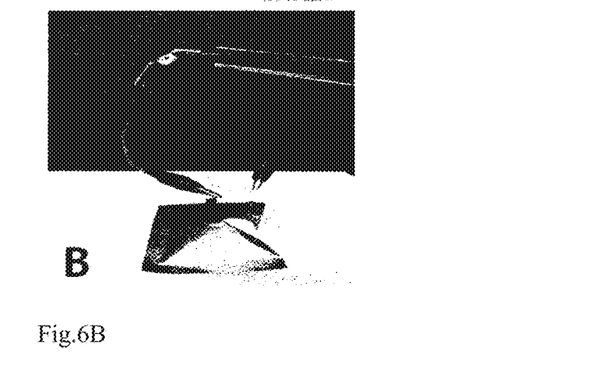

First, a lamp was connected to each of the batteries prepared in Example and Comparative Example in a charging state, and exposed to a temperature of 150° C. for 30 minutes. The results are shown in FIG. 6 as images. Referring to FIG. 6, a lamp was not turned off, and it operated in the case of Example (A) according to the present invention, but a lamp did not operate in the case of Comparative Example (B).

Therefore, it can be seen that the electrode-separator composite according to the present invention includes a cellulose nanofiber separator having excellent heat resistance and thus exhibits excellent dimensional stability even when exposed to high temperature.

EXPERIMENTAL EXAMPLE 4

Porosity and Electronic Conductivity Evaluation

Experiments for evaluating the porosity and electronic conductivity of the electrode-separator composite according to the present invention were conducted.

First, a change in weights before and after the composites were impregnated with butanol (n-butanol) was measured, and porosities according to Example and Comparative Example were measured. Also, electronic conductivities according to Example and Comparative Example were measured using a 4-point probe.

Figure 9:
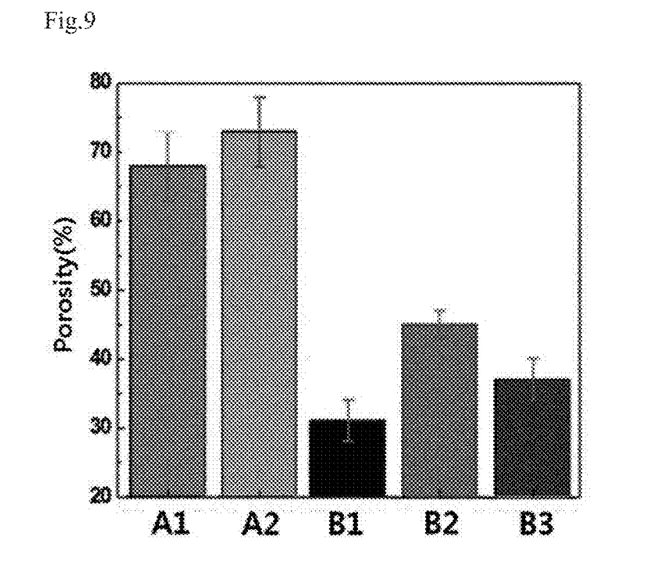
FIG. 9 is a graph showing the evaluation result of porosity according to an example and a comparative example, wherein A1 represents a positive electrode of an example, A2 represents a negative electrode of an example, B1 represents a positive electrode of a comparative example, B2 represents a separator of a comparative example, and B3 represents a negative electrode of a comparative example.
Figure 10:
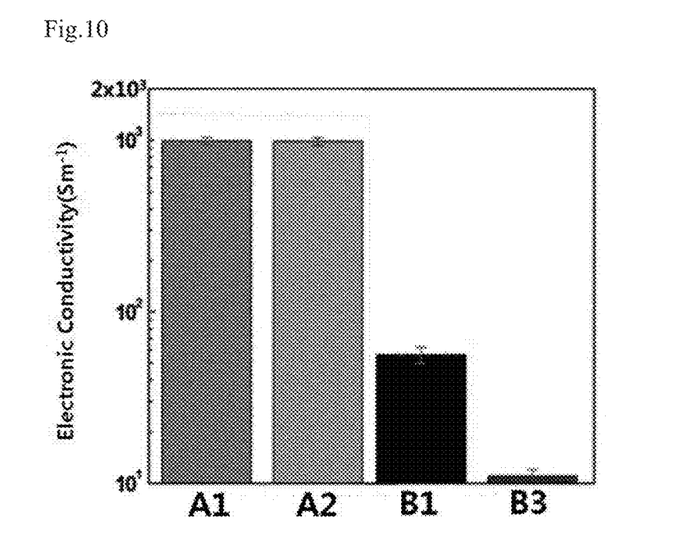
FIG. 10 is a graph showing the evaluation result of electronic conductivity according to an example and a comparative example, wherein A1 represents a positive electrode of an example, A2 represents a negative electrode of an example, B1 represents a positive electrode of a comparative example, and B3 represents a negative electrode of a comparative example.

The results are shown in FIGS. 9 and 10. FIG. 9 is a graph showing the evaluation result of porosity according to Example and Comparative Example, wherein A1 represents a positive electrode of Example, A2 represents a negative electrode of Example, B1 represents a positive electrode of Comparative Example, B2 represents a separator of Comparative Example, and B3 represents a negative electrode of Comparative Example.

FIG. 10 is a graph showing the evaluation result of electronic conductivity according to Example and Comparative Example, wherein A1 represents a positive electrode of Example, A2 represents a negative electrode of Example, B1 represents a positive electrode of Comparative Example, and B3 represents a negative electrode of Comparative Example.

Referring to FIGS. 9 and 10, it can be seen that a high porosity of 65% or more was exhibited in the case of Example, but a low porosity of less than 50% was exhibited in the case of Comparative Example, and significantly higher electronic conductivity was also exhibited in the case of Example compared to Comparative Example.

EXPERIMENTAL EXAMPLE 5

Evaluation of Charging and Discharging Characteristics Depending on Bending

Experiments for evaluating the charging and discharging characteristics of a battery depending on repetitive bending of the batteries prepared in Example and Comparative Example were conducted.

A voltage when a battery was bent to have a radius of curvature of 2.5 mm and a voltage when a battery was not bent were observed every 3 minutes during operation of a battery under charging and discharging conditions of 1 C. As a result, as shown in FIG. 11, it was confirmed that the separator-electrode composite exhibited stable charging and discharging behaviors due to excellent mechanical properties and interfacial stability of the electrode and the separator as identified above compared to Comparative Example.

Referring to FIG. 11, b represents a point at which a battery is bent, I represents a voltage according to Example upon charging, II represents a voltage according to Comparative Example upon charging, III represents a voltage according to Example upon discharging, and IV represents a voltage according to Comparative Example upon discharging. It can be seen that a very low voltage difference of less than 0.02 is exhibited when a battery is bent upon charging and discharging in the case of Example (II and III), but a large voltage difference of about 0.04 upon charging and about 0.09 upon discharging when a battery is bent is exhibited in the case of Comparative Example (I and IV).

Therefore, it was confirmed that the electrochemical element according to the present invention was capable of stable charging and discharging behaviors due to interfacial stability of the electrode and the separator and excellent mechanical properties even when physical deformation is applied to a battery.

EXPERIMENTAL EXAMPLE 6

Cycle Characteristics Evaluation

Experiments for evaluating the cycle characteristics of the batteries prepared in Example and Comparative Example were conducted.

In the evaluation of cycle characteristics of a battery, charging and discharging progressed at a current rate of 2.0 C up to 200 cycles, followed by 300 cycles at a current rate of 10 C.

Figure 12:
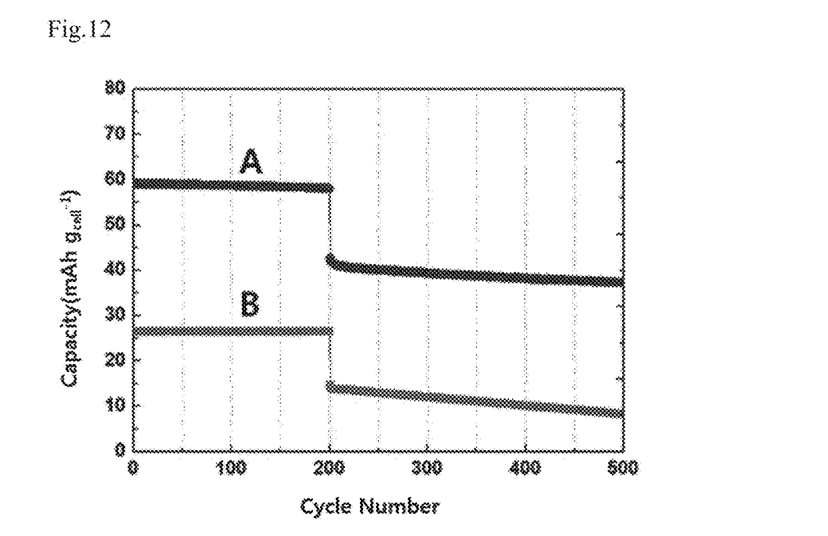
FIG. 12 is a graph showing cycle characteristics according to an example and a comparative example, wherein A represents an example and B represents a comparative example.

The results are shown in FIG. 12, wherein A represents Example and B represents Comparative Example. Referring to FIG. 12, it can be seen that significantly excellent cycle characteristics were exhibited in the case of Example according to the present invention compared to Comparative Example because interfacial stability of the electrode and the separator was excellent, and ionic conductivity and electronic conductivity were improved due to non-use of a separate binder.

Figure 13:
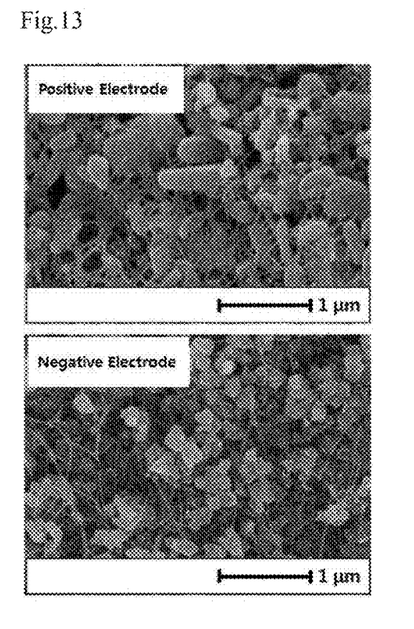
FIG. 13 illustrates SEM images of electrode surfaces after cycle measurement according to an example.

FIG. 13 illustrates SEM images of electrode surfaces after cycle measurement of the electrode-separator composite prepared in Example. Referring to FIG. 13, it can be seen that the electrode-separator composite according to the present invention maintained its original structure even after the cycle measurement.

Therefore, it was confirmed that the electrochemical element to which the electrode-separator composite according to the present invention is applied does not use a binder and an electrode current collector and thus exhibits excellent cycle characteristics and mechanical properties.

EXPERIMENTAL EXAMPLE 7

Evaluation of Charge and Discharge Rate Capabilities of Battery

Experiments for evaluating charge and discharge rate capabilities of the batteries prepared in Example and Comparative Example were conducted.

Figure 14:
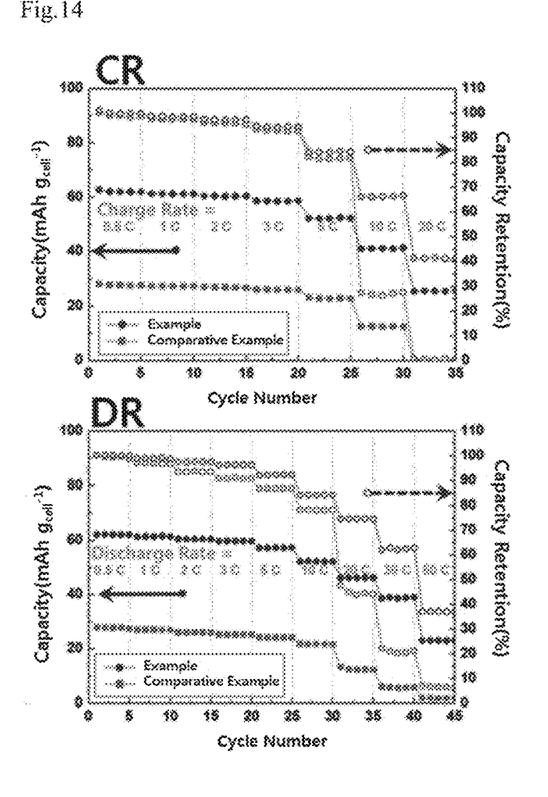
FIG. 14 is a graph showing the evaluation result of charge and discharge rate capabilities according to an example and a comparative example, wherein CR represents rate capability upon charging and DR represents rate capability upon discharging.

For charging rate capability, the battery was charged at a current rate of 0.5 to 20 C and then discharged at a current rate of 0.5 C to evaluate the discharge capacity of the battery, and for discharging rate capability, the battery was discharged at a current rate of 0.5 to 50 C under a constant charge current of 0.5 C to evaluate the discharge capacity of the battery. The results are shown in FIG. 14. In FIG. 14, CR represents rate capability upon charging and DR represents rate capability upon discharging. Referring to FIG. 14, it can be seen that charge and discharge rate capabilities were significantly excellent in the case of Example compared to Comparative Example.

Therefore, it can be seen that the battery to which the electrode-separator composite according to the present invention is applied exhibits significantly excellent charge and discharge rate capabilities compared to Comparative Example because interfacial stability of the electrode and the separator was excellent and ionic conductivity and electronic conductivity were improved due to non-use of a separate binder.

EXPERIMENTAL EXAMPLE 8

Evaluation of Dimensional Stability Depending on Exposure to High Temperature Experiments for evaluating the appearance and dimensional stability before and after exposure to high temperature according to Example and Comparative Example were conducted.

Figure 15:
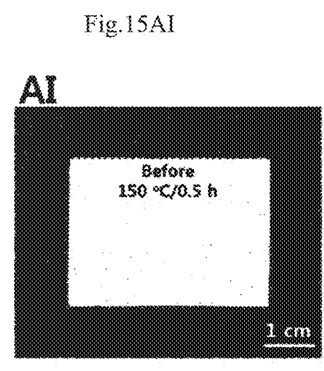

A lamp was connected to each of the batteries according to Example and Comparative Example, and then remained for 30 minutes at a high temperature of 150° C. The results are shown in FIG. 15. In FIG. 15, each of AI and AII represents Example before and after exposure to high temperature, and each of BI and BII represents Comparative Example before and after exposure to high temperature. Referring to FIG. 15, it can be seen that extreme thermal shrinkage occurred at high temperature in the case of the polyolefin-based separator applied in Comparative Example, but excellent dimensional stability was exhibited both before and after exposure to high temperature in the case of the electrode-separator composite applied in Example.

Figure 16:
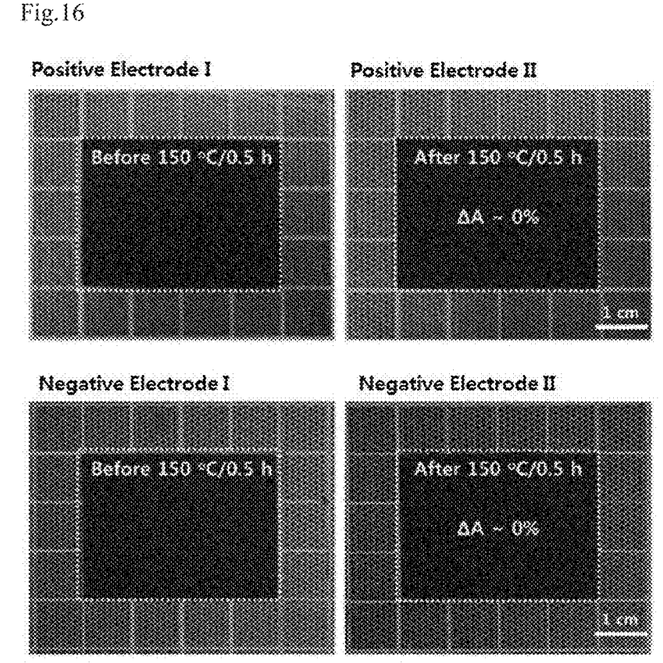
FIG. 16 illustrates images of an electrode-separator composite according to the present invention before and after exposure to high temperature, wherein I represents before exposure to high temperature and II represents after exposure to high temperature.

FIG. 16 illustrates images obtained by evaluating dimensional stabilities of a positive electrode and a negative electrode of the electrode-separator composite according to the present invention before and after exposure to high temperature. In FIG. 16, I represents before exposure to high temperature, and II represents after exposure to high temperature. Referring to FIG. 16, it can be seen that thermal shrinkage caused by high temperature hardly occurs.

Therefore, it was confirmed that the electrochemical element to which the electrode-separator composite according to the present invention is applied includes cellulose nanofibers having excellent heat resistance and thus can implement excellent dimensional stability even at high temperature.

Through the above experiments, it can be seen that the electrochemical element to which the electrode-separator composite according to the present invention is applied can simultaneously implement excellent flexibility, high capacity, high output characteristics and high stability.

INDUSTRIAL APPLICABILITY

The electrochemical element according to the present invention has a highly stable interfacial surface due to the physically combined separator and electrode, can ensure excellent mechanical properties, can implement stable battery performance even against deformations caused by various external forces, and can suppress the risk of battery ignition, explosion and the like caused by deformation of the battery, and thus can be usefully used in various fields such as a solar cell, a display, a portable electronic device, electronic paper, a paper battery and the like.

What is claimed is:

1. An electrode-separator composite comprising:
   an electrode including a composite of an active material and a conductive material with a nanofiber structure; and
   a separator combined with the electrode includes a cellulose nanofiber and an inorganic particle;
   wherein the inorganic particle includes one or more selected from the group consisting of $SiO_2$, $Al_2O_3$, $TiO_2$, $BaTiO_3$, $Li_2O$, $Li_3N$, $BaO$, $Na_2O$, $Li_2CO_3$, $CaCO_3$, $LiAlO_2$, $SrTiO_3$, $SnO_2$, $CeO_2$, $MgO$, $NiO$, $CaO$, $ZnO$, $ZrO_2$ and $SiC$;
   wherein the electrode does not comprise a binder;
   wherein the active material includes active material includes one or more selected from the group consisting of lithium nickel oxide, lithium cobalt oxide, lithium nickel manganese oxide, lithium nickel cobalt manganese oxide, lithium nickel cobalt aluminum oxide, lithium iron phosphate oxide, lithium metal, an alloy of lithium metal and a transition metal oxide,
   wherein the conductive material with a nanofiber structure includes one or more selected from the group consisting of carbon nanofibers, carbon nanotubes, copper, nickel, aluminum, silver and a polyphenylene derivative,
   wherein the cellulose nanofiber include one or more selected from the group consisting of cellulose nanofibers separated from a nano-sized woody material, sea algae nanofibers, and bacterial cellulose obtained by incubating bacteria,
   wherein the electrode includes one or more selected from the group consisting of sodium dodecyl sulfate (SDS), sodium dodecylbenzene sulfonate (SLABS), cetrimide (CTAB), polybenzimidazole (PBI) and polyvinylpyrrolidone (PVP).

2. The electrode-separator composite according to claim 1, wherein weight per unit area is 30 mg/cm$^2$ or less.

3. The electrode-separator composite according to claim 1, wherein the separator has an average thickness ranging from 0.01 to 500 μm.

4. The electrode-separator composite according to claim 1, wherein the electrode has an average thickness ranging from 0.01 to 500 μm.

* * * * *

UNITED STATES PATENT AND TRADEMARK OFFICE
CERTIFICATE OF CORRECTION

PATENT NO. : 11,251,459 B2
APPLICATION NO. : 15/514519
DATED : February 15, 2022
INVENTOR(S) : Sun Young Lee et al.

It is certified that error appears in the above-identified patent and that said Letters Patent is hereby corrected as shown below:

On the Title Page

Item (30) Foreign Application Priority Data:
"KR10-2014-0129587"
Should be changed to:
--10-2014-0129587--

Signed and Sealed this
Nineteenth Day of July, 2022

Katherine Kelly Vidal
*Director of the United States Patent and Trademark Office*